US009836451B2

(12) United States Patent
Halbani et al.

(10) Patent No.: US 9,836,451 B2
(45) Date of Patent: Dec. 5, 2017

(54) DYNAMIC TOKENS FOR AN EXPRESSION PARSER

(71) Applicant: SAP SE, Walldorf (DE)

(72) Inventors: Ronen Halbani, Zoran (IL); Liad Barel, Ramat Hasharon (IL); Shahar Tarshish, Herzelia (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/091,191

(22) Filed: Apr. 5, 2016

(65) Prior Publication Data

US 2017/0242842 A1    Aug. 24, 2017

Related U.S. Application Data

(60) Provisional application No. 62/296,950, filed on Feb. 18, 2016.

(51) Int. Cl.
G06F 17/20    (2006.01)
G06F 17/27    (2006.01)

(52) U.S. Cl.
CPC ........ G06F 17/277 (2013.01); G06F 17/2725 (2013.01)

(58) Field of Classification Search
None
See application file for complete search history.

(56) References Cited

U.S. PATENT DOCUMENTS

| 7,912,705 | B2* | 3/2011 | Wasson | G06F 17/241 |
| | | | | 704/9 |
| 9,390,087 | B1* | 7/2016 | Roux | G06F 17/2881 |
| 2004/0078190 | A1* | 4/2004 | Fass | G06F 17/241 |
| | | | | 704/7 |
| 2007/0179776 | A1* | 8/2007 | Segond | G06F 17/2247 |
| | | | | 704/9 |
| 2009/0144248 | A1* | 6/2009 | Treadgold | G06F 17/2785 |
| 2010/0024031 | A1* | 1/2010 | Shribman | G06F 9/45512 |
| | | | | 726/18 |
| 2014/0330809 | A1* | 11/2014 | Raina | G06F 17/2705 |
| | | | | 707/722 |
| 2016/0364377 | A1* | 12/2016 | Krishnamurthy | G06F 17/271 |

* cited by examiner

Primary Examiner — Marcus T Riley
(74) Attorney, Agent, or Firm — Fish & Richardson P.C.

(57) ABSTRACT

The disclosure generally describes computer-implemented methods, software, and systems for enabling dynamic tokens in an expression parser. An example method includes identifying an expression represented as a natural language input for validation by a parser. Each of the phrases in the expression are iteratively converted into a set of tokens by determining whether a current phrase matches a pre-defined token associated with a known grammar rule, and, in response to determining that the current phrase matches a pre-defined token, generating a token for the current phrase for use in validating the expression. If the current phrase does not match a pre-defined token, the unrecognized string of characters is compared to a plurality of dynamic tokens included in an external pool of tokens to generate a generic token of an identified type. The dynamic token is replaced with the generic token and can be used to validate the expression.

15 Claims, 5 Drawing Sheets

| ID | DESCRIPTION | BUSINESS_DATA_TYPE | IS_COLLECTION | IS_CONDITIONAL_CONTEXT | CONTEXT |
|---|---|---|---|---|---|
| 431056b3105bbadc1b0616a20cdd975 | Players | ? | 1 | 0 | ? |
| 3dded8bbeff2d0a8bcef9aa871f45fe6e | id of the player | String | 0 | 0 | player |
| 0327dcf6ea90223f5e42bdfdc6e4567e | id of current player | String | 0 | 1 | player |
| acf3c35b71c107b3b8b3269a9506dba0 | id of all players | String | 1 | 0 | player |
| 0f1d8907f1f49b1fd743ba0d5a21d14f | name of the player | String | 0 | 0 | player |
| 02bc96e0ec8bbe46b172fc4f5114d951 | name of current player | String | 0 | 1 | player |
| 7eb3498439f5003d2807294cb8401da6 | name of all players | String | 1 | 0 | player |
| ea0ae3c3dc6fb872eba6b8f19799a011 | country_id of the player | String | 0 | 0 | player |
| f9c4e714a25c01a88b7ad951fd417afa | country_id of current player | String | 0 | 1 | player |
| 8cf876c39eb1a0720d3abfe56cdb3c48 | country_id of all players | String | 1 | 0 | player |
| 47001744448269fc59878045f51d6f55 | birthdate of the player | Date | 0 | 0 | player |
| 2439e7051e2fe96bd9edaad78ffb4272 | birthdate of current player | Date | 0 | 1 | player |
| 47ab3c6a1d391b5af86ddf97ff5c9dff | birthdate of all players | Date | 1 | 0 | player |
| a3ff8f2e6eca1af113b6efc61eef5202 | age of the player | Number | 0 | 0 | player |
| a0986fd49f5c99fff76b021c817a61e1 | age of current player | Number | 0 | 1 | player |
| 87a4920779816d172f6e423c8c95be43 | age of all players | Number | 1 | 0 | player |
| f3e34180e901d77f8a82edd8816093a4 | gender of the player | String | 0 | 0 | player |
| 7254566687bbf0edab1a1ef0ee55b1a37 | gender of current player | String | 0 | 1 | player |
| cea6d6152635aacc96126940b487a33c4 | gender of all players | String | 1 | 0 | player |
| e09b5e2f7ea56d9ba5aaa76aa2d2d479 | registration_date of the player | Date | 0 | 0 | player |
| c35aa1f3ba31f4e8e8dad1e3bc8ee0b | registration_date of current player | Date | 0 | 1 | player |
| 3d5c76941b8e54365073ebb597fe15eb | registration_date of all players | Date | 1 | 0 | player |

FIG. 4

DYNAMIC TOKENS FOR AN EXPRESSION PARSER

CLAIM OF PRIORITY

This application claims priority under 35 USC §119(e) to U.S. Patent Application Ser. No. 62/296,950, filed on Feb. 18, 2016, the entire contents of which are hereby incorporated by reference.

TECHNICAL FIELD

The present disclosure relates to computer systems and computer-implemented methods for enabling dynamic tokens in an expression parser.

Rule parsers are based on predefined tokens. A token is composed of one or more fragments split up by a predefined character (e.g., a space or other delimiter). In many instances, business rules may be written in a natural language format to allow for non-technical users to define usable business rules and/or queries. A sample token may include the following: "sum," "sum of," "average," etc. A business expression can be composed of one or more tokens. Sample expressions include the following: "number of purchases of a customer is greater than 10," "number of customers is great than 10," etc. In the expressions above, four fixed tokens are defined in the parser—"number of," "purchases of a customer," "customers" and "is greater than." Rule parsers can be used to generate a syntax tree—a representation of the abstract structure of the source code (here, the "rule"). Once the parser generates the syntax tree, the rule is based only on these fixed tokens designed in the developers' design time as the rules are created. Such rule sets and tokens are predefined by the developer and are not expandable, as the parser cannot understand tokens not previously defined in the design time.

SUMMARY

The disclosure generally describes computer-implemented methods, software, and systems for enabling dynamic tokens in an expression parser. An example method includes identifying an expression for validation by a parser, the expression represented as a natural language input including a set of phrases. Each of the phrases of the natural language input are iteratively converted into a set of tokens. The conversion includes determining whether a current phrase matches a pre-defined token associated with a known grammar rule, and, in response to determining that the current phrase matches a pre-defined token associated with a known grammar rule, generating a token for the current phrase for use in validating the expression. In response to determining that the current phrase does not match a pre-defined token associated with a known grammar rule, the method compares the unrecognized string of characters to a plurality of dynamic tokens included in an external pool of tokens, identifies a dynamic token from the external pool of tokens corresponding to the unrecognized string of characters, identifies a type of the identified dynamic token, and generates a generic token of the identified type of the identified dynamic token. The identified dynamic token is replaced with the generic token for use in validating the expression, and a tokenized expression is generated by combining the generated tokens. The tokenized expression can then be validated.

In some instances, after validating the tokenized expression, each generic token in the tokenized expression is replaced with the corresponding dynamic token. The tokenized expression can then be executed after the corresponding dynamic tokens replace the corresponding generic tokens. In some instances, the expression represents a query. In some instances, each dynamic token is associated with a type, with the type being one of a string, a number, and a date.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4 is an example screenshot of an entered rule using a dynamic token.

DETAILED DESCRIPTION

Figure 1:
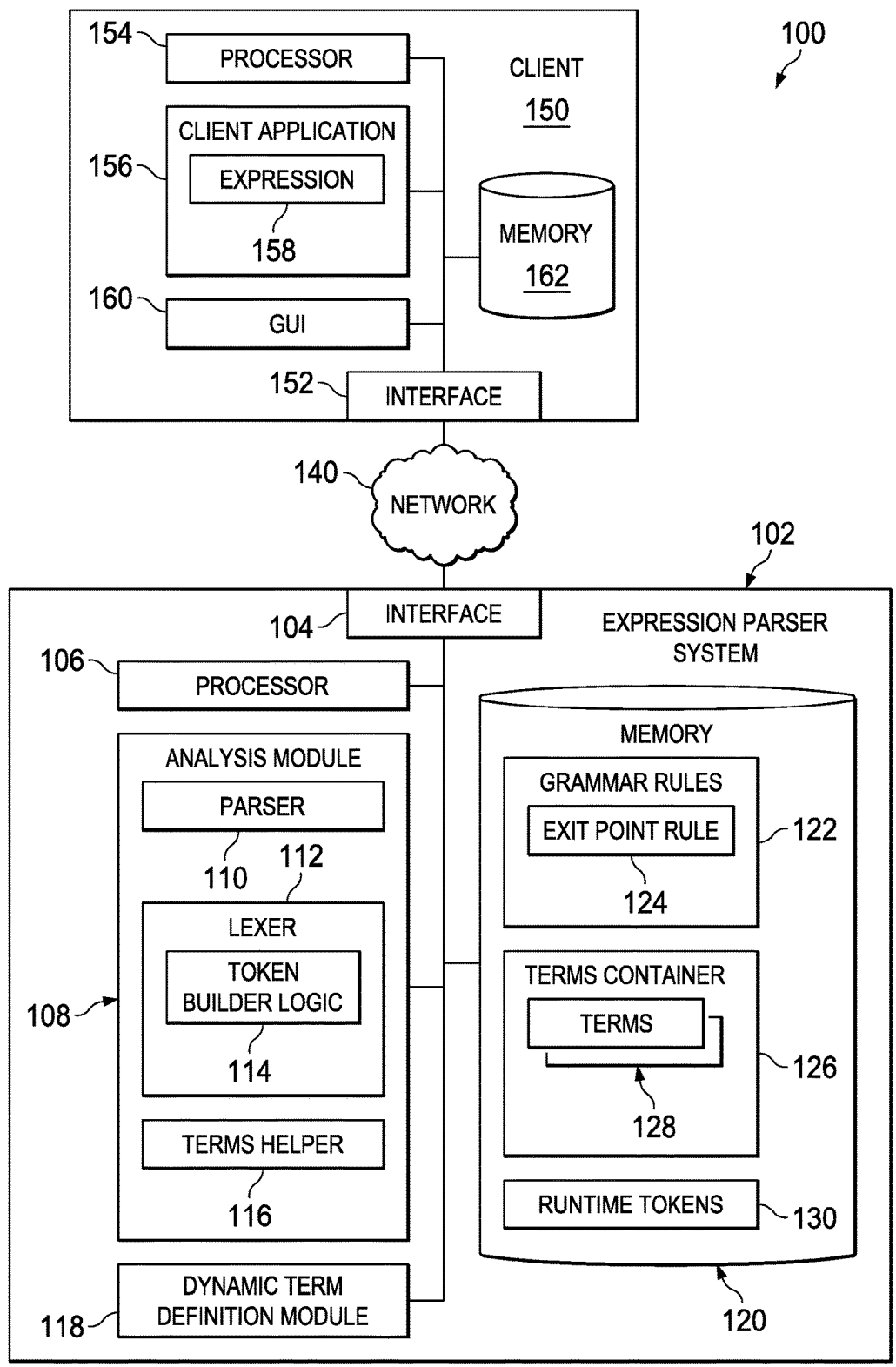
FIG. 1 is a block diagram illustrating an example system for enabling dynamic tokens in a business rule parser.

The present solution defines methods for extending the available tokens that can be used in interpreting a business rule, specifically by providing an algorithm for handling dynamic tokens defined after the initial developer's design time and associated with the parser system in a term or vocabulary repository. In doing so, additional flexibility is provided to users to extend business rules to correspond to their specific solutions and data, removing the prior limitations placed on them by current parser solutions. In providing such a tool, tokens can be extended by users and developers after the original parser is shipped, allowing the tokens to be extended accordingly to the parties' particular business and organizational needs.

To enable such dynamic tokens (as compared to the pre-defined "static" tokens), a concept is defined that a user can create an external pool of tokens, each token associated with a particular token type and, in some cases, additional information defining the token. The lexical analysis performed upon received business rules is extended, allowing for an enhanced tokenizer to evaluate the business or expression rule before it is parsed, thereby allowing dynamic tokens to be analyzed and updated prior to parsing to allow for correct handling of the same. During the lexical analysis, dynamic tokens are identified within the expression and are mapped to a generic design-time matching token for purposes of the parser. Once the tokenizing iteration over the entire expression is complete, the dynamic token string is converted, or mapped, to the design time language that the parser expects. For example, the dynamic token "purchases of the customer" may be mapped to a collection type entry, where the parser is capable of understanding the collection type even though it may be unable to understand the "purchases of the customer" phrasing. In the example expression of "number of purchases of a customer is greater than 10", the design-time conversion of the expression would be to "number of <type collection> is greater than 10." In such an example, the runtime input would still receive the input of the full expression including the dynamic token, while the design time aspect would understand the generic type. The lexical analysis described herein identifies the unknown string values (here, "purchases of the customer") and saves a map to these values, where the unknown string value match a dynamic token included in a user-specific set of terms or tokens (e.g., a token or term dictionary or vocabulary). A term helper may be used to build the token and pass the built token back to the parser.

An example analysis of the phrase "purchases of a customer" from the expression "number of purchases of a customer is greater than 10" is examined here. It is assumed that the pre-defined tokens "number of" and "greater than" are known by the parser, but that the phrase "purchases of a customer" is a dynamic token unknown to the parser. During the initial lexical analysis, the lexer arrives to the word unknown string value of "purchases" and begins its analysis. First, a determination is made as to whether any of the dynamic tokens start with the word "purchases." A review of the term or token dictionary indicates yes. Next, a determination is made as to whether any of the dynamic tokens start with the words "purchases of." Again, the answer is yes. Next, the phrases "purchases of a" and "purchases of a customer" are both confirmed to be included in at least one dynamic token within the dictionary. Finally, a determination is made that no terms in the dictionary begin with the phrase "purchases of a customer is," such that the dynamic token included in the current expression is "purchases of a customer." Once the complete phrase is known, the dictionary is searched to identify or calculate the particular type of the token "purchases of a customer," which in the current case is of the type collection. Using this type for the dynamic token, the parser can then validate the previously unknown string as a <type collection> entry instead of a "purchases of a customer," where the runtime expression validated by the parser is "number of <type collection> is greater than 10". Once the parser has validated this expression and the expression is to be executed, the <type collection> can be replaced with the proper link to the user's specific data corresponding to the "purchases of a customer" as defined in the dictionary, and the expression can be evaluated using the dynamic token.

Turning to the illustrated embodiment, FIG. 1 is a block diagram illustrating an example system 100 for enabling dynamic tokens in a business rule parser. As illustrated in FIG. 1, system 100 is a client-server system capable of identifying expressions and/or rules for parsing in the expression parser system 102 (either directly at the system 102 or via a client 150), where the expression parser system 102 can interpret such expressions that include non-standard and dynamic tokens other than those initially developed at the design time of the parser. In some instances, the expression parser system 102 may be located at a particular client 150 (e.g., as a local application), the expression parser system 102 may be a cloud-based solution, or the system 102 may be a server or service executing remotely from a client 150 as illustrated in FIG. 1.

As illustrated, system 100 includes or is communicably coupled with the client 150 and the expression parser system 102, where these systems are connected, at least in part, by network 140. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, client 150 and expression parser system 102, among other illustrated components, may be any computer or processing device such as, for example, a blade server, general-purpose personal computer (PC), Mac®, workstation, UNIX-based workstation, smartphone, tablet, or any other suitable device. Moreover, although FIG. 1 illustrates a single expression parser system 102, expression parser system 102 can be implemented using two or more systems, as well as computers other than servers, including a server pool. Alternatively, the functionality of the expression parser system 102 may be available locally at client 150, at network 140 as a cloud-based solution, or in any other suitable location. The present disclosure contemplates computers other than general purpose computers, as well as computers without conventional operating systems.

In general, the expression parser system 102 is a system used to interpret expressions, including natural language expressions to perform business-related actions, including queries and data analysis. Input to the expression parser system 102 is a grammar of a particular programming language, whose generated output is the source code of the parser. In general, the parser system 102 can interpret the received expression in order to validate the expression as valid before passing the request to a backend system for performing the action described by the expression. In prior systems, tokens to be validated by the parser system 102 were required to be pre-defined by the developer of an application to allow the parser system 102 to understand and interpret the content and context of a particular expression. In the present system, all tokens and input a particular parser can understand to build expressions, or sentences, with is a predefined set of tokens. In other words, the parser's design time must include a definition of those tokens to be used after development.

In contrast, the illustrated system 100 provides a solution where dynamic tokens can be generated by end users and others after the parser system 102 has been shipped or installed. Operators (e.g., greater than, less than) and aggregators (e.g., sum of, average of, etc.) can be provided by the initial functionality shipped with the initial parser system 102, including in some instances, one or more predefined tokens. The illustrated system 100, however, allows users and administrators to dynamically update their system to include an external pool, or dictionary, or additional dynamic tokens and/or terms relevant to those user's business needs and operations. The phrases "dynamic token(s)" and "term(s)" in the context of this description may be used interchangeably, and are to be differentiated from the pre-defined or static tokens which cannot be changed other than at the original design time. The dynamic tokens and terms allow users to define particular contexts upon and/or in which the pre-defined operators execute, thereby allowing the operators to be applied intelligently within the user's unique system.

As illustrated, parser system 102 includes an interface 104, a processor 106, an analysis module 108, a dynamic term definition module 118, and memory 120. The interface 104 is used by the parser system 102 for communicating with other systems in a distributed environment—including within the environment 100—connected to the network 140, e.g., client 150, external dictionaries or terms containers 126, as well as other systems communicably coupled to the network 140. Generally, the interface 104 comprises logic encoded in software and/or hardware in a suitable combination and operable to communicate with the network 140. More specifically, the interface 104 may comprise software supporting one or more communication protocols associated with communications such that the network 140 or interface's hardware is operable to communicate physical signals within and outside of the illustrated environment 100.

Network 140 facilitates wireless or wireline communications between the components of the environment 100 (e.g., between the client 150 and the parser system 102, as well as with any other local or remote computer, such as additional clients, servers, or other devices communicably coupled to network 140, including those not illustrated in FIG. 1). In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the parser system 102 or portions thereof) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the parser system 102 includes processor 106. Although illustrated as a single processor 106 in FIG. 1, two or more processors 106 may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the parser system 102. Specifically, the processor 106 executes the algorithms and operations described in the illustrated figures, including the operations performing the functionality associated with the parser system 102 generally, as well as the various software modules (e.g., the analysis module 108 and the dynamic term definition module 118), including the functionality for sending communications to and receiving transmissions from the various systems involved in the dynamic token definition and interpretation.

As noted, the parser system 102 includes the analysis module 108. The analysis module 108 is used to receive and/or identify expressions to be interpreted by the parser system 102. Using its functionality, the analysis module 108 reviews the identified expression, identifies known and unknown strings within the expression, and determines how the expression should be processed and analyzed. The analysis module 108 may be assisted by a plurality of components to perform its operations (although such components may be included in a single component in some instances), including a parser 110, a lexer 112, and a terms helper 116. In some instances, one or more of these components may be external to the analysis module 108 and/or the parser system 102. In such instances, the analysis module 108, e.g., via interface 104, may provide one or more interfaces allowing communications and exchanges of information with other systems. In general, the analysis module 108 represents an application, set of applications, software, software modules, or combination of software and hardware used to manage the operations associated with interpreting, validating, and using one or more expressions for the illustrated system.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

In the illustrated example, the parser 110, lexer 112, and terms helper 116 perform the primary operations associated with interpreting and using dynamic tokens in parsing particular expressions. In general, an expression is received by the parser system 102 and the analysis module 108. The lexer 112 is a program or component that performs lexical analysis of a particular expression to identify particular tokens included within the expression. The lexer 112 plays an important role, particularly for dynamic tokens, as the lexer 112 separates the expression into particular tokens before the parser 110 analyzes and validates the expression as a whole. The lexer's 112 lexical analysis comprises a process of separating a stream of characters within the identified expression into different words, or tokens. The process may be considered tokenization of the expression, that is, the process of converting a sequence of characters into a sequence of tokens understood by the parser 110. In prior solutions, the lexer 112 simply identified tokens from the developer-generated dictionary at design time. In the present solution, however, the lexer 112 includes expanded operations to allow the lexer 112, while reviewing particular characters and words within the expression, to identify one or more words or phrases that are not included in the original pre-defined token set. When an unrecognized character and/or phrase is identified, the lexer 112 may use a set of token builder logic 114 (described in more detail below) to begin a separate process of identifying the unrecognized characters as one or more dynamic tokens (e.g., terms 128) stored in a dynamic token repository (e.g., the terms container 126). As the lexer 112 iterates over the unrecognized characters, the terms helper 116 can be used to generate a runtime token 130 that stores the temporary and incomplete token as analyzed by the lexer 112. As additional characters are reviewed by the lexer 112, those characters are added to the runtime token 130 by the terms helper 116. Once the lexer 112 identifies the end of the dynamic token being analyzed, the runtime token 130 stored in memory 120 can be finalized and identified as a dynamic token corresponding to the term 128 in the terms container 126. After determining the particular dynamic token included in the expression, the lexer 112 can identify, from the terms container 126, a corresponding type to the dynamic token based on information stored with the corresponding term 128. The lexer 112 can then provide the typed token back into the set of tokens representing the expression, which allows the parser 110 to validate the expression.

Parser 110 accepts the tokens produced by the lexer 112 and determines if proper sentences have been formed. Parser 110 analyzes the identified expression at a grammatical level, whereas the lexer 112 analyzes the expression at a word-based level. The parser 110 reviews the tokenized expression to determine if the grammar rules 122 are satisfied as per the original programming and requirements of the parser system 102 (e.g., as developed at design time). As the lexer 112 has replaced the previously unrecognized dynamic tokens with a typed token, the parser 110 is then able to review and validate the tokenized expression without issue and without needing to specifically consider the dynamic tokens included in the originally identified expression. The grammar rules 122 applied by the parser 110 in validating the expression comprise a list of rules containing rules needed for lexical analysis and parsing. As illustrated, the grammar rules 122 are associated with at least one exit point rule 124. The exit point rule 124 is used by the lexer 112 to perform the analysis of unrecognized characters as described above. Essentially, when the lexer 112 identifies the unknown characters, the exit point rule 124 is trigged in order for the lexer 112 to perform its dynamic token analysis.

The parser system 102 also includes the dynamic term definition module 118. The dynamic term definition module 118 is used to add new dynamic tokens or terms 128 to the terms container 126. The dynamic term definition module 118 may receive an upload of a file including a set of dynamic tokens and add those new terms 128 to the terms container 126. Alternatively, new terms 128 may be individually added via a web-based or application interface.

The parser system 102 also includes memory 120, or multiple memories 120. The memory 120 may include any memory or database module(s) and may take the form of volatile or non-volatile memory including, without limitation, magnetic media, optical media, random access memory (RAM), read-only memory (ROM), removable media, or any other suitable local or remote memory component. In some instances, at least a portion of the memory 120 may include an in-memory database. The memory 120 may store various objects or data, including financial data, user information, administrative settings, password information, caches, applications, backup data, repositories storing business and/or dynamic information (e.g., the pre-defined tokens and any dynamic tokens), and any other appropriate information including any parameters, variables, algorithms, instructions, rules, constraints, or references thereto associated with the purposes of the parser system 102. Additionally, the memory 120 may store any other appropriate data, such as VPN applications, firmware logs and policies, firewall policies, a security or access log, print or other reporting files, as well as others. As illustrated, memory 120 can store the grammar rules 122, terms container 126, and runtime tokens 130, as well as any other information relevant to the parser system 102.

The terms container 126 comprises the set of user-defined (or customer-, end-user, or administratively-defined) terms 128 specific to a particular business, enterprise, or other organization. These terms 128 were not included in the original set of pre-defined tokens, and require the intervention of the additional functionality of the lexer 112 to allow for those terms 128 to be validated by the parser 110. The terms 128 may be received via the dynamic term definition module 118 in any suitable manner, and can include a set of information for each term 128. In some implementations, the terms container 126 and its associated terms 128 may be located remotely from memory 120 and/or the parser system 102, but accessible for execution of the analysis module 108 and the dynamic term definition module 118.

FIG. 4 provides an example term container 126. As illustrated in term container 126, each term 128 includes a unique identifier 402, a description 406 representing the natural language definition of the term 128. In other words, the dynamic token of "id of the player" included in a particular expression would correspond to the entry 416 having description "id of the player". Each term 128 also includes a particular data type 408. This type is required for each term 128, as the lexer 112 maps the particular term 128 to a token of the appropriate type to be included in the tokenized expression validated by the parser 110. As illustrated, each term 128 is also associated with an "Is_Collection" column 410, which provides information as to whether a single value will be considered with the term 128 or whether multiple sets of values or entries are associated therewith. The "Is_Conditional_Context" column 412 can define whether a particular dynamic token is context-dependent. The context column 414 provides information of the relevant context of the dynamic context.

Returning to FIG. 1, illustrated environment 100 includes one or more clients 150. Particular clients 150 may connect to the parser system 102 to submit or enter particular expressions for analysis by the analysis module 108. Each client 150 may be specifically associated with a particular user or multiple users. In other instances, clients 150 may be generally available computing systems accessible by a plurality of users. As illustrated, users may submit expressions 158 via client application 156, which may include or be associated with a web browser, a remotely executed application associated with the parser system 102, or any other suitable application or component. The client application 156 may be associated with an application window or presentation used to present information associated with that application to the user regarding the client application 156, such as in the GUI 160. In some instances, the client application 156 may be used to upload and/or modify the terms 128 included in the terms container 126, as well, such as via the dynamic term definition module 118.

The illustrated client 150 is intended to encompass any computing device such as a desktop computer, laptop/notebook computer, mobile device, smartphone, personal data assistant (PDA), tablet computing device, one or more processors within these devices, or any other suitable processing device. In general, the client 150 and its components may be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer. In some instances, the client 150 may comprise a computer that includes an input device, such as a keypad, touch screen, or other device(s) that can interact with the client application 156, and an output device that conveys information associated with the operation of the applications and their application windows to the user of the client 150. Such information may include digital data, visual information, or a GUI 160, as shown with respect to the client 150. Specifically, the client 150 may be any computing device operable to connect to or communicate with the parser system 102, other clients 150, and/or other components via network 140, as well as with the network 140 itself, using a wireline or wireless connection. In general, client 150 comprises an electronic computer device operable to receive, transmit, process, and store any appropriate data associated with the environment 100 of FIG. 1.

As illustrated, client 150 includes an interface 152, a processor 154, client application 156, a graphical user interface (GUI) 160, and memory 162. The interface 152 and processor 154 may be similar to or different than interface 104 and processor 106. In general, processor 154 executes instructions and manipulates data to perform the operations of the client 150. Specifically, the processor 154 executes the algorithms and operations described in the illustrated figures and associated with the client 150, including the operations performing the functionality associated with the client application 156. Further, memory 162 may be similar to or different than memory 120. While illustrated generally, memory 162 may store or maintain information related to the parser system 102, including a user- or client-specific terms container 126, as well as other suitable data.

GUI 160 of the client 150 interfaces with at least a portion of the environment 100 for any suitable purpose, including generating a visual representation of the client application 156. In particular, the GUI 160 may be used to view a presentation associated with the submission or entry of one or more expressions 158, including the results of an executed expression 158, as well as to view and interact with various Web pages and applications located local or external to the client 150. Generally, the GUI 160 provides the customer with an efficient and user-friendly presentation of data provided by or communicated within the system. The GUI 160 may comprise a plurality of customizable frames or views having interactive fields, pull-down lists, and buttons operated by the user. For example, the GUI 160 may provide interactive elements that allow a user to view or interact with information related to the operations of the process associated with the expression analysis process. In general, the GUI 160 is often configurable, supports a combination of tables and graphs (bar, line, pie, status dials, etc.), and is able to build real-time portals, application windows, and presentations. Therefore, the GUI 160 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
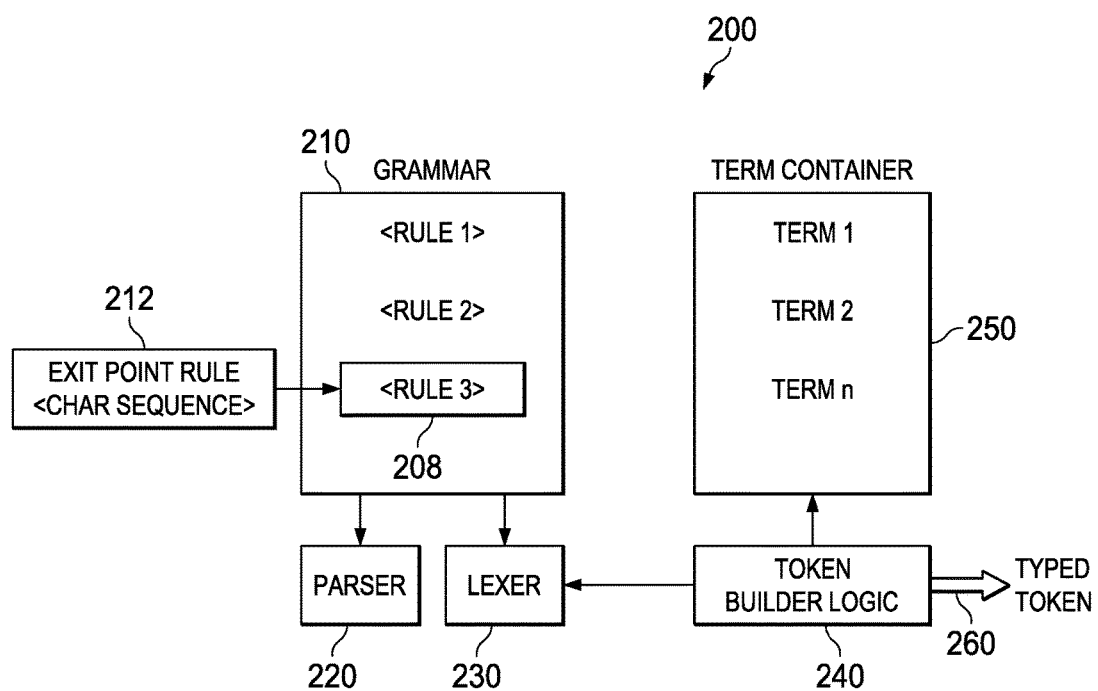
FIG. 2 is an illustration of the components and their interactions within an example system enabling dynamic tokens in a business rule parser.

FIG. 2 is an illustration 200 of the components and their interactions within an example system enabling dynamic tokens in a business rule parser. The illustration 200 of FIG. 2 is a simplified diagram intended to demonstrate an example set of interactions between the components. Alternative implementations are still contemplated and are not intended to require the particular aspects and components described in FIG. 2.

As illustrated in FIG. 2, a parser 220 and lexer 230 are used to interpret an identified expression. The parser's 220 and lexer's 230 operations are governed by the grammar rules 210, where the grammar rules 210 include a plurality of rules for how particular syntax in an expression is to be interpreted and managed. As described in FIG. 1, the lexer 230 performs a lexical analysis of the expression initially to tokenize the characters, words, and phrases of the expression before the parser 220 performs its validation operations. The grammar rules 210 define operations of both the parser 220 and the lexer 230. While the grammar rules 210 illustrate only three rules, a plurality of various rules for interpreting and understanding particular expressions are available. Illustrated rule 3 208 represents an exit point rule 212 unique to the present solution. The exit point rule 212 is used when the lexer 230, while reviewing characters and words within the expression being evaluated, identifies an unrecognized characters or word. Upon such recognition, the lexer 230 exits the standard rule set to perform a comparison of the unsigned characters/word to one or more dynamic tokens or terms included in term container 250.

Once the lexer 230 initiates the analysis of a current character or word, the lexer 230 applies a set of token builder logic 240 used to identify a particular dynamic token or term from the term container 250 matching the current character or word in the expression. The lexer 230 and its logic 240 iterate over the characters and words of the expression to identify a particular dynamic token from the term container 250 that matches the characters and/or words within the expression. As described, the current characters or words included in the expression and included in the token being built may be a single set of characters, a single word, a phrase including multiple words, or any other suitable combination of characters. The lexer 230 can continue to add characters and/or words into the token begin built until no further matches from the term container 250 are identified, upon which the token is closed and/or completed. Once the portion of the expression is matched to a particular term in the term container 250, the dynamic token is generated. From the term container 250, a type of the dynamic token is identified and is used within the tokenized expression in order to allow the parser 220 to successfully validate the expression. As illustrated in example FIG. 4, the type of the dynamic token can be defined within the term container 250, with a typed token 260 being created and used in place of the dynamic token for the parser's 220 analysis. The lexer 230 can then move to the next characters after those included in the unrecognized character string and continue standard tokenization activities. If the lexer 230 is unable to match a particular term from the term container 250 to the unrecognized string being analyzed, an error may be returned indicating that the unrecognized string is not identified and requesting user action to correct the issue. In some instances, multiple unrecognized strings may be included within a particular expression, causing the exit point rule 212 to be triggered two or more times during analysis of a particular expression.

Figure 3:
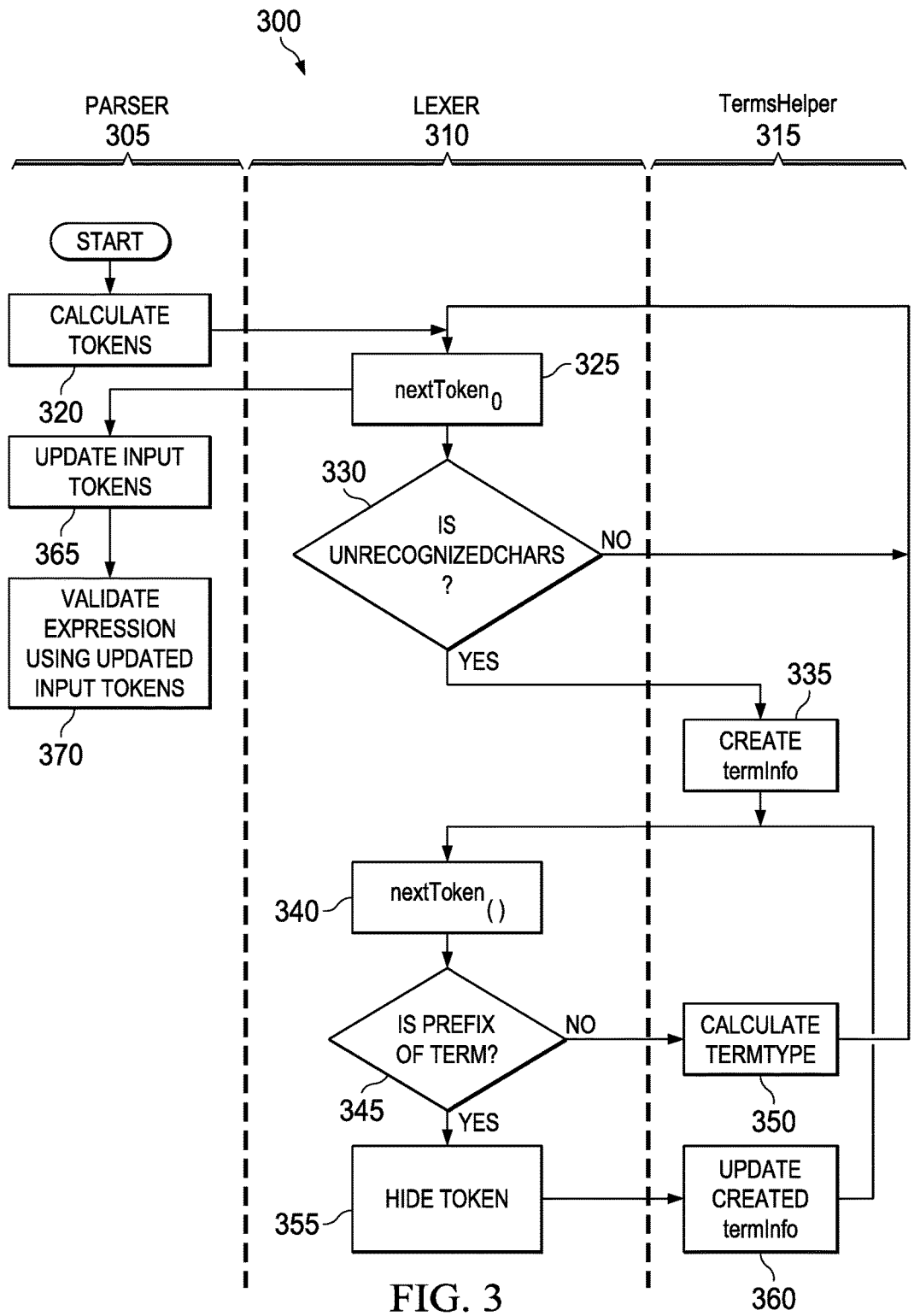
FIG. 3 is a swim lane diagram between a parser, a lexer, and a terms helper component in one example implementation of an example system enabling dynamic tokens in a business rule parser.

FIG. 3 is a swim lane diagram illustrating interactions 300 between a parser 305, a lexer 310, and a terms helper component 315 in one example implementation of an example system enabling dynamic tokens in a business rule parser. As illustrated, the operations describe a sharing of responsibilities for the analysis of a particular expression or query. The parser 305, lexer 310, and terms helper 315 have been described above. The interactions 300 begin as an expression or query is identified and analysis begins. The parser 305 initially performs a calculate tokens operation (320) at the starting point, which passes the full expression or query to the lexer 310 in the natural language format in which it is received.

The lexer 310 receives the passed expression and begins its analysis of the individual characters and words of the expression, beginning with a first token at 325. The lexer 310, in a standard expression including only pre-defined tokens, performs its lexical analysis and determines which characters and words make up various pre-defined tokens. As illustrated, the lexer 310 would consider, at 330, whether the current character and/or word represents an unrecognized character. Upon determining that they do not, the lexer 310 would perform the tokenization and continue through its analysis. However, in instances where the expression being analyzed includes a dynamic token or term (i.e., a special token case), the analysis differs.

If, at 330, the lexer 310 identifies a special token case where the current characters or token are an unrecognized character string, an alternative flow for identifying the next token is performed. When the unrecognized character string is identified, two possibilities exist. The unrecognized character string may include a dynamic token or term (e.g., as defined in the term container 250), in which case the process continues to evaluate the unrecognized character string until it is found to no longer be contained within a term. The second option, not illustrated in FIG. 3, is that if the unrecognized character string is not included in and does not include a dynamic token or term, a determination is made that the string is not part of a dynamic term, thereby generating an error which is passed back to the parser 305 and the analysis is aborted.

In response to the lexer 310 determining that the current string is unrecognized, the operations move to 335, where the terms helper component 315 creates a placeholder (i.e., termInfo) for the current phrase. The placeholder may be an object in memory and is created at the beginning of an analysis of the unrecognized string. The placeholder can be updated as the comparison of additional characters/words are added to the term.

At 340, control returns to the lexer 310 where the next portion of the unrecognized string is analyzed. As noted, the next portion may be the next word of the unrecognized string or it may be the next character of the unrecognized string. In either instance, a determination is made at 345 as to whether the next portion of the unrecognized string is a prefix of a particular dynamic term. That is, the lexer 310 analyzes whether any prior portion of the unrecognized string and the next portion of the unrecognized string remain as a prefix of or are included within a particular term. If so, at 355 the token hides the current token. That is, the current portion of the token is removed from its own token and is updated to include the token within the previously created placeholder as the next part of the object stored in memory. At 360, the placeholder and its entry in memory can be updated by the terms helper 315. In some instances, a key and index associated with the placeholders may be updated. Once the placeholder is updated, operations return to 340, where the next portion of the unrecognized string is analyzed.

Returning to 345, if it is determined that the next portion of the unrecognized string is not a portion of a prefix of a particular dynamic term, then the current dynamic term (included in the placeholder) is determined to be the dynamic token for the unrecognized string. At 350, that dynamic term is looked up in the term container to identify the type corresponding to the term. The term is added to an expression term stack and used upon completion of the expression analysis to generate the updated tokens included in the tokenized expression.

Once the unrecognized string is identified and the term type is calculated, the operations return to 325 where the next token is analyzed. The iterative process continues until all tokens in the original expression are analyzed. In some instances, only one unrecognized string may be present, although more than one unrecognized string may be included in a particular expression such that two or more dynamic token analyses are performed.

After analysis of all tokens included in the expression, the tokenized expression is passed from the lexer 310 to the parser 305, where, at 330, the input tokens for the expression are updated in the parser 305 at 365. The parser 305 can then validate the expression using the updated input tokens at 370. If the expression passes validation, then the expression can be used by an associated system (e.g., a CRM system, an SCM system, an HR system, a business rule system, a query execution system, etc.) to interpret and execute the now-validated expression. Further, after validation, the expression can be updated with the generic typed token being replaced by the corresponding dynamic token identified during the process.

Figure 5:
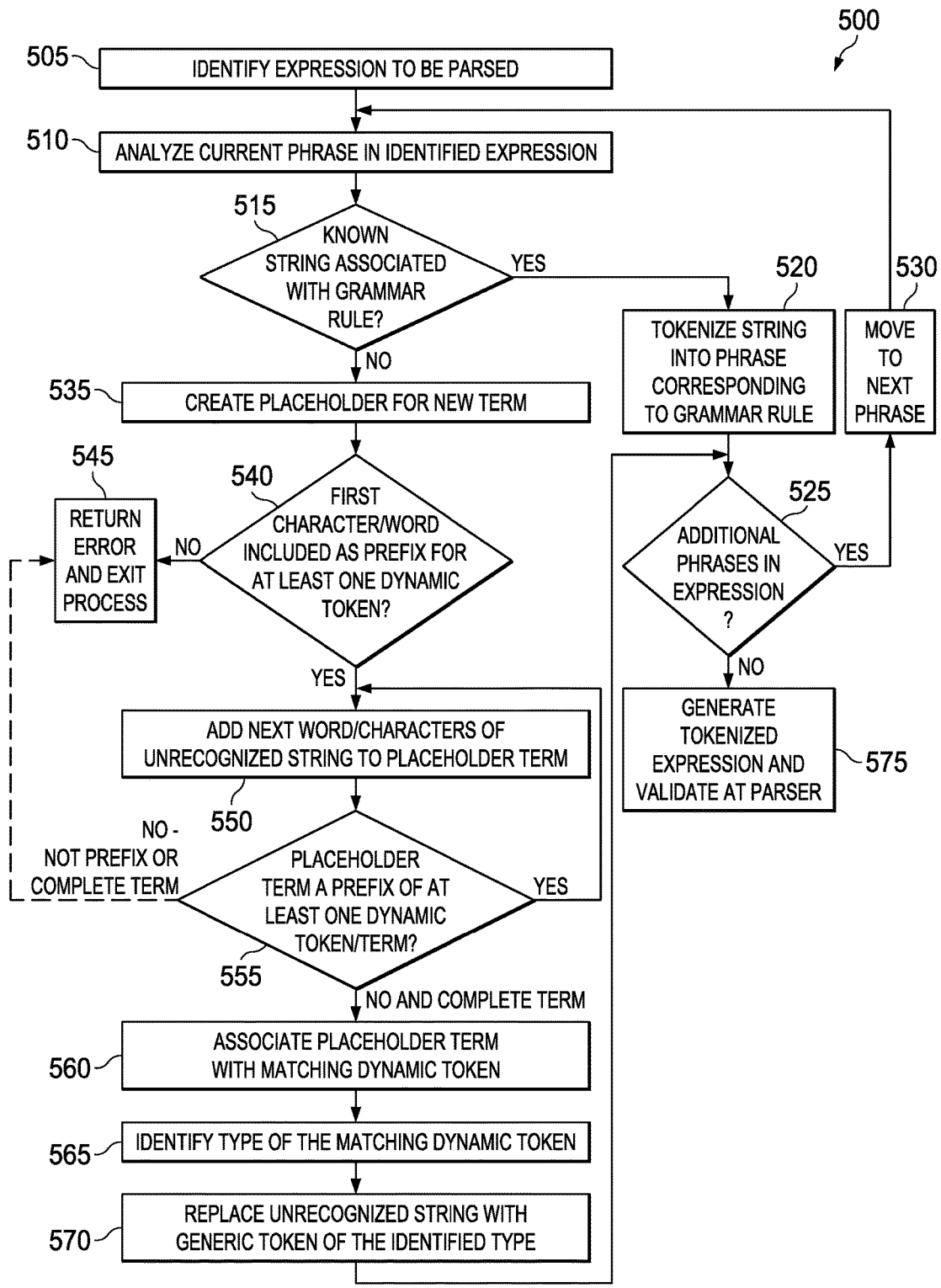
FIG. 5 is an illustration of example operations for interpreting a business rule including at least one dynamic token.

FIG. 5 is an illustration of example operations for interpreting a business rule expression including at least one dynamic token. For clarity of presentation, the description that follows generally describes method 500 in the context of the system 100 illustrated in FIG. 1. However, it will be understood that method 500 may be performed, for example, by any other suitable system, environment, software, and hardware, or a combination of systems, environments, software, and hardware as appropriate. In the described method 500, the operations may be performed at a parser system (e.g., parser system 102) or any other suitable location.

At 505, an expression to be parsed is identified. In some instances, the expression may be a query, a business rule, or another parsable natural language expression comprising a series of words and/or phrases. The expression can be parsed based on a known set of grammar rules defined for a parser and a lexer.

At 510, a current phrase in the identified expression is analyzed. The current phrase of the identified expression may include one or more words within the identified expression. At 515, a determination is made as to whether the current phrase represents a known string associated with a pre-defined grammar rule. If it is, the string is tokenized into a phrase corresponding to the grammar rule at 520. If additional words within the expression remain (as determined at 525), method 500 moves to the next phrase at 530 and returns to 510 where the next phrase is analyzed.

Returning to 515, if the current phrase is not a known string associated with a pre-defined grammar rule, method 500 moves to 535 where a placeholder object for the new term is created. The placeholder object can store the current set of characters or words within the unrecognized string as the analysis of the unknown phrase is ongoing.

At 540, a determination is made as to whether the first character or word of the unrecognized string is included as a prefix or beginning portion of at least one dynamic token. In some instances, the analysis may be performed on a character-by-character basis, while in others, a word-by-word basis. The unrecognized string may include one or more delimiters, including periods, spaces, underscores, or other delimiters. A set of dynamic tokens or terms may be defined by end users, customers, or other appropriate parties in order to provide a customized dictionary of terms relevant to the end users or customer's business context. The customized dictionary (e.g., the term container 126 and 250, a vocabulary container, a term repository, etc.) can be updated dynamically with information identifying customer-specific contexts to be used with pre-defined operators and grammar rules. The determination at 540 can be made by comparing the first character or word of the unrecognized string to the set of dynamic tokens to determine whether the first character or word is related to one of the dynamic tokens. If not, an error can be returned and analysis can be exited at 545, as the unrecognized string is determined not to be associated with a dynamic token and therefore representing an erroneous entry in the expression. If, however, the first character or word is included as a prefix of at least one dynamic token, method 500 continues at 550.

At 550, the next word or character within the unrecognized string is added to the placeholder term. At 555, a determination is made as to whether the placeholder term remains a prefix of at least one dynamic token. If it does, method 500 returns to 550, where the next word or character is added to the placeholder term. If the placeholder term is not a prefix of the at least one token and the placeholder term matches a complete dynamic token, then the term is considered complete and method 500 moves to 560. Additionally, method 500 also evaluates the updated placeholder term to determine if the new portion of the placeholder term causes an error. For example, if the unrecognized characters are "age off the customer", the method may not return an error after "age" as a dynamic token of "age of the customer" may be available. However, when the word "off" is added to the placeholder term, an error will be returned if no other entries in the term container correspond to, either fully or partially, to the phrase "age off" As illustrated, method 500 then continues at 545 where an error is returned and the process is exited.

At 560, the placeholder term is associated with the matching dynamic token from the customized dictionary. At 565, a term of the dynamic token is identified. The type may be a string, a number, a date, or another suitable term capable of being validated by the parser associated with the system. The type of the dynamic token is identified when the dynamic token is added to the customized dictionary by the end user or customer. A typed token of the type corresponding to the matching dynamic token can be used as a replacement token for the unrecognized string at 570. Because the parser will only recognize terms of a particular type, and not the dynamic tokens themselves, the replacement typed token allows the parser to validate the expression without error where the other portions of the expression are correct. The typed token can be mapped to the actual dynamic term, such that after validation of the expression by the parser, the dynamic term is replaced and execution of the expression results in an accurate result using the dynamic token. Once the replacement is made, method 500 returns to 525, where a determination is made as to whether additional phrases are included in the expression. If so, method 500 continues at 530.

If no additional phrases remain, method 500 continues at 575, where the fully tokenized expression comprising each of the tokens identified by method 500 is generated. The fully tokenized expression, now including typed tokens in place of any dynamic tokens, can be successfully validated using the known grammar rules at the parser. Once validated, the expression can replace the typed tokens with their mapped dynamic tokens and execute the expression, as requested. Validation by the parser allows the expression to then be passed to any suitable system for interpreting and executing the expression, whether that is a business system to be queried or a business rule to be executed, or any other suitable execution method.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In one implementation, expressions may be analyzed after they are completely entered by the user. In others, expressions may be evaluated as they are typed or entered and before they are completed. In such instances, partial expressions may be evaluated as they are typed, with suggestions from the pre-defined grammar rules and the set of dynamic tokens being provided where appropriate. For example, a grammar rule with the operator "Sum of" may exist. If an entry of "Sum" is completed initially, the system may identify it as a prefix for a particular pre-defined rule, and suggest "of" and any other entries with "Sum" as a prefix via an autocomplete suggestion. For a partial expression phrase such as "age of the", no pre-defined rule may be identified as a potential match. Based on this, the system may use the operations described to identify whether the unrecognized characters in "age of the" are a potential match to one of the dynamic tokens. As the phrase is not complete, in a non-autocomplete instance an error may be thrown since the term does not match any complete terms within the dynamic tokens. However, in the autocomplete instance, one or more dynamic tokens may include the partial phrase "age of the", such as "age of the player," "age of the players," etc. In such instances, where the phrase including a prefix of at least one dynamic token is determined to be incomplete, the system may provide one or more autocomplete suggestions that can be used and implemented by the user. Other such alternatives and modifications may be used in different implementations.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by at least one processor, the method comprising:
identifying an expression for validation by a parser, the expression represented as a natural language input including a set of phrases;
iteratively converting each of the phrases of the natural language input into a set of tokens, wherein converting each phrase includes:

determining whether a current phrase matches a pre-defined token of a plurality of pre-defined tokens associated with a known grammar rule;

in response to determining that the current phrase matches a pre-defined token associated with a known grammar rule, generating a token for the current phrase for use in validating the expression;

in response to determining that the current phrase does not match a pre-defined token associated with a known grammar rule, the current phrase comprising an unrecognized string of characters:
  comparing the unrecognized string of characters to a plurality of dynamic tokens included in an external pool of tokens, the plurality of dynamic tokens included in the external pool of tokens different than the plurality of pre-defined tokens associated with the known grammar rule;
  identifying a dynamic token from the external pool of tokens corresponding to the unrecognized string of characters;
  identifying a type of the identified dynamic token, wherein the identified type is one of a string, a number, or a date; and
  generating a generic token for the current phrase based on the identified type of the identified dynamic token, wherein the generic token is a character string corresponding to the identified type of the identified dynamic token; and
  replacing the identified dynamic token with the generic token for use in validating the expression;

generating a tokenized expression by combining the generated tokens; and validating the tokenized expression.

2. The method of claim 1, further comprising, after validating the tokenized expression, replacing each generic token in the tokenized expression with the corresponding dynamic token.

3. The method of claim 2, further comprising executing the tokenized expression.

4. The method of claim 1, wherein the expression represents a query.

5. The method of claim 1, wherein each dynamic token is associated with a type.

6. A non-transitory, computer-readable medium storing one or more instructions executable by a computer system to perform operations comprising:
  identifying an expression for validation by a parser, the expression represented as a natural language input including a set of phrases;
  iteratively converting each of the phrases of the natural language input into a set of tokens, wherein converting each phrase includes:
    determining whether a current phrase matches a pre-defined token of a plurality of pre-defined tokens associated with a known grammar rule;
    in response to determining that the current phrase matches a pre-defined token associated with a known grammar rule, generating a token for the current phrase for use in validating the expression;
    in response to determining that the current phrase does not match a pre-defined token associated with a known grammar rule, the current phrase comprising an unrecognized string of characters:
      comparing the unrecognized string of characters to a plurality of dynamic tokens included in an external pool of tokens, the plurality of dynamic tokens included in the external pool of tokens different than the plurality of pre-defined tokens associated with the known grammar rule;
      identifying a dynamic token from the external pool of tokens corresponding to the unrecognized string of characters;
      identifying a type of the identified dynamic token, wherein the identified type is one of a string, a number, or a date; and
      generating a generic token for the current phrase based on the identified type of the identified dynamic token, wherein the generic token is a character string corresponding to the identified type of the identified dynamic token; and
      replacing the identified dynamic token with the generic token for use in validating the expression;
  generating a tokenized expression by combining the generated tokens; and
  validating the tokenized expression.

7. The non-transitory, computer readable medium of claim 6, the operations further comprising, after validating the tokenized expression, replacing each generic token in the tokenized expression with the corresponding dynamic token.

8. The non-transitory, computer readable medium of claim 7, further comprising executing the tokenized expression.

9. The non-transitory, computer readable medium of claim 6, wherein the expression represents a query.

10. The non-transitory, computer readable medium of claim 6, wherein each dynamic token is associated with a type.

11. A computer system, comprising:
  a computer memory; and
  a hardware processor interoperably coupled with the computer memory and configured to perform operations comprising:
    identifying an expression for validation by a parser, the expression represented as a natural language input including a set of phrases;
    iteratively converting each of the phrases of the natural language input into a set of tokens, wherein converting each phrase includes:
      determining whether a current phrase matches a pre-defined token of a plurality of pre-defined tokens associated with a known grammar rule;
      in response to determining that the current phrase matches a pre-defined token associated with a known grammar rule, generating a token for the current phrase for use in validating the expression;
      in response to determining that the current phrase does not match a pre-defined token associated with a known grammar rule, the current phrase comprising an unrecognized string of characters:
        comparing the unrecognized string of characters to a plurality of dynamic tokens included in an external pool of tokens, the plurality of dynamic tokens included in the external pool of tokens different than the plurality of pre-defined tokens associated with the known grammar rule;
        identifying a dynamic token from the external pool of tokens corresponding to the unrecognized string of characters;
        identifying a type of the identified dynamic token, wherein the identified type is one of a string, a number, or a date; and
        generating a generic token for the current phrase based on the identified type of the identified dynamic token, wherein the generic token is a character string corresponding to the identified type of the identified dynamic token; and replacing the identified dynamic token with the generic token for use in validating the expression;

generating a tokenized expression by combining the generated tokens; and validating the tokenized expression.

12. The system of claim 11, the operations further comprising, after validating the tokenized expression, replacing each generic token in the tokenized expression with the corresponding dynamic token.

13. The system of claim 12, further comprising executing the tokenized expression.

14. The system of claim 11, wherein the expression represents a query.

15. The system of claim 11, wherein each dynamic token is associated with a type.

* * * * *